United States Patent
Gloss

(10) Patent No.: US 9,338,787 B2
(45) Date of Patent: May 10, 2016

(54) NETWORK ANALYSIS FOR RADIO RESOURCE ACTIVATION IN GREEN MOBILE NETWORKS

(71) Applicant: Alcatel Lucent, Boulogne Billancourt (FR)

(72) Inventor: Bernd Gloss, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/404,712

(22) PCT Filed: May 23, 2013

(86) PCT No.: PCT/EP2013/060571
§ 371 (c)(1),
(2) Date: Dec. 1, 2014

(87) PCT Pub. No.: WO2013/178520
PCT Pub. Date: Dec. 5, 2013

(65) Prior Publication Data
US 2015/0126209 A1    May 7, 2015

(30) Foreign Application Priority Data
Jun. 1, 2012   (EP) ..................... 12305613

(51) Int. Cl.
*H04W 72/08*   (2009.01)
*H04W 24/08*   (2009.01)
(Continued)

(52) U.S. Cl.
CPC ............ *H04W 72/085* (2013.01); *H04W 24/08* (2013.01); *H04W 52/0206* (2013.01); *H04W 72/048* (2013.01)

(58) Field of Classification Search
CPC ....... H04W 64/00; H04W 4/021; H04W 4/02; H04W 24/10; H04W 4/025; H04W 4/00; H04W 28/08; H04W 36/32; H04W 48/16; H04W 56/0065; H04W 16/18; H04W 28/048

USPC ....................................................... 455/452.1
See application file for complete search history.

(56) References Cited

U.S. PATENT DOCUMENTS 8,417,249 B2    4/2013   Mori et al.
9,179,403 B2    11/2015  Ho et al.
(Continued)

FOREIGN PATENT DOCUMENTS

EP    2 387 265 A1    11/2011
JP    2013-528959 A    7/2013
(Continued)

OTHER PUBLICATIONS

Mitsubishi Electric, "Energy Saving for HeNBs," 3rd Generation Partnership Project (3GPP), 3GPP TSG RAN WG3 Meeting #66bis, R3-100201, pp. 1-4, XP050424063, Valencia, Spain, Jan. 18-22, 2010.
(Continued)

*Primary Examiner* — Kwasi Karikari
(74) *Attorney, Agent, or Firm* — Fay Sharpe LLP

(57) ABSTRACT

The present invention relates to a method and apparatus for optimizing radio coverage and power consumption within a mobile communication network (1). In accordance with an embodiment of the invention, radio measurements (UE_meas1; BS_meas1; BS_meas2) carried out by subscriber devices (11) and/or radio base stations (21; 23), as well as user geographical locations (UE_pos1; UE_pos2; UE_pos3) at the time the radio measurements have been carried out, are gathered. Antenna geographical locations (ant_pos22; ant_pos23) are then derived from the radio measurements and the user geographical locations, and radio propagation models (rpm22; rpm23) from the antenna geographical locations that best fit the radio measurements at the user geographical locations. The so-derived radio propagation models from the so-derived antenna geographical locations are then supplied to a radio resource controller (41) for activation of dormant cells (C22; C23).

13 Claims, 3 Drawing Sheets

(51) Int. Cl.
  *H04W 52/02* (2009.01)
  *H04W 72/04* (2009.01)

(56) References Cited

U.S. PATENT DOCUMENTS

| | | | |
|---|---|---|---|
| 2012/0015657 A1* | 1/2012 | Comsa et al. | 455/436 |
| 2012/0142328 A1* | 6/2012 | Awoniyi et al. | 455/418 |
| 2013/0084892 A1* | 4/2013 | Teyeb et al. | 455/456.6 |
| 2013/0235778 A1 | 9/2013 | Maeder et al. | |

FOREIGN PATENT DOCUMENTS

| | | |
|---|---|---|
| JP | 2013-542646 | 11/2013 |
| JP | 2013-545383 A | 12/2013 |
| WO | WO 2008/136416 A1 | 11/2008 |
| WO | WO 2011/085238 A2 | 7/2011 |
| WO | WO 2012/037999 | 3/2012 |
| WO | WO 2012/055984 | 5/2012 |

OTHER PUBLICATIONS

Mitsubishi Electric, "Dynamic Setup of HNBs for Energy Savings and Interference Reduction," $3^{rd}$ Generation Partnership Project (3GPP), 3GPP TSG RAN WG3 Meeting #61, R3-081949, pp. 1-7, XP050165010, Jeju Island, Korea, Aug. 18-22, 2008.
Sujuan Feng et al., "Self-Organizing Networks (SON) in 3GPP Long Term Evolution," Nomor Research GmbH, Munich, Germany, pp. 1-15, May 20, 2008.
"LTE; Evolved Universal Terrestrial Radio Access (E-UTRA); Potential solutions for energy saving for E-UTRAN (3GPP TR 36.927 version 10.1.0 Release 10)," ETSI, pp. 1-23, XP014067987, Oct. 2011.
International Search Report for PCT/EP2013/060571 dated Jul. 22, 2013.
Media Tek, "Use MFT for Energy Saving," 3GPP TSG-RAN WG3 #75, R3-120177, Dresden, Germany, Feb. 6-10, 2012, 2 pages.
"Evolved Universal Terrestrial Radio Access (E-UTRA) and Evolved Universal Terrestrial Radio Access Network (E-UTRAN); Stage 2, Release 11 (3GPP TS 36.300 V 11.1.0)," pp. 1-194, Mar. 2012.

\* cited by examiner

NETWORK ANALYSIS FOR RADIO RESOURCE ACTIVATION IN GREEN MOBILE NETWORKS

TECHNICAL FIELD OF THE INVENTION

The present invention relates to a method and apparatus for optimizing radio coverage and power consumption within a mobile or wireless communication network.

TECHNICAL BACKGROUND OF THE INVENTION

With the ever-increasing data traffic demand in today's mobile networks, immediate solutions for capacity improvement are sought by the operators. Thanks to higher spatial reuse of spectrum, short-radius cell in the range of 50 to 100 meters appear as a promising solution to satisfy bandwidth extensive traffic demands and to enhance the Quality of Experience (QoE) of mobile users.

Heterogeneous Networks (HetNet) are now being deployed, where cells of smaller footprint size (so-called pico, metro or micro cells) are embedded within the coverage area of larger umbrella cells (so-called macro cells), primarily to provide increased capacity in targeted areas of data traffic concentration. HetNet try to exploit the spatial variation in user and traffic distribution to efficiently increase the overall capacity of mobile networks.

HetNet poses new challenges for efficient network planning and operation.

So far, network planning and operation are based on expensive drive tests for gathering radio measurements within a given geographical area and identifying possible coverage holes, as well as on intensive network configuration, including adding or moving antenna sites, and optimizing radio transmission parameters (antenna tilt and gain, transmit spectrum, transmit power, etc).

Alternatively, network planning and operation may be based on radio propagation models from known antenna locations. 3D geographical maps are then fed to the radio propagation models, together with further radio transmission parameters, so as to guess what the receive signal and interference level is expected to be at a particular geographical location, and further to determine an optimal network configuration.

These network planning tools are well suited for legacy mobile networks, which mostly accommodate macro cells at known locations. With the ever increasing number of small cells being deployed for next-generation mobile networks, these tools prove inefficient and inaccurate.

Also, the current network configuration gets very quickly outdated as the radio propagation environment always changes owing to new construction works (e.g., new high buildings, old buildings being torn down), or owing to new cells being brought into service or existing cells being brought out of commission (which may alter the observed level of interference at a given location), or still owing to weather or season impacts (e.g., tree leaves, snow falls), yielding sub-optimal network performances.

Another important issue for today mobile networks is sustainable development, which is a long-term commitment for all people in the world. Manufacturer should do their best to handle the resource shortage and environment deterioration by improving the power efficiency of the mobile networks, thereby reducing greenhouse emissions and Operational Expenditures (OPEX). Thus, the power efficiency in the infrastructure and terminal becomes an essential part of the cost-related requirements in mobile networks, and there is a strong push to investigate possible network energy saving solutions.

One of this solution is to switch small idle cells into some kind of sleeping (or dormant) mode during low-activity periods, their traffic being handled by still-active neighboring cells, further referred to as coverage cells.

Switching off cells may however bring about coverage holes and/or QoE degradations, and one needs to come up with a solution to wake up the dormant cells whenever appropriate.

The technical specification entitled "Potential Solutions for Energy Saving for E-UTRAN (Release 10)", ref. 3GPP TR 36.927 V10.1.0, published by the 3rd Generation Partnership Project (3GPP) in September 2011, describes different methods for switching the dormant cells back into operation.

Cells may enter or leave dormant mode based on centralized Operation And Maintenance (OAM) decisions, which are made based on statistical information, e.g. load information, quality metrics, etc. The OAM decisions can be pre-configured or directly signaled to the cells.

As an alternative solution, when cells are in dormant mode and the load increases on the coverage cell, the coverage cells may not know the most appropriate dormant cells to wake-up. The coverage cells may wake-up one or more of the neighboring dormant cells. The final decision to leave dormant mode is however taken by the dormant cell based on information locally available.

As a third solution, when the coverage cell detects high load, it uses a proprietary algorithm to decide which dormant cells should be activated. The algorithm could rely on pre-defined 'low-load periods' policies for each neighbor cell. The 'low-load periods' information can first be derived from OAM based performance counters, and then the decision implemented in the coverage cell.

As a fourth solution, when the coverage cell detects high load, it can request some dormant cells to switch on their listening capability to perform and report Interference over Thermal (IoT) measurements as defined in 3GPP TS 36.214.

As a fifth solution, when the coverage cell detects high load, it can request some dormant cells to transmit the pilot signal for at least a short time interval (the so-called 'probing' interval). After this interval, all or some these cells will return to dormant mode. The User Equipment (UE) covered by the coverage cell will be configured to perform radio measurements for those cells during this interval and to send back measurement results. Based on the measurement results, the coverage cell will then determine which cells should be switched on.

As a sixth solution, when the coverage cell detects high load, it can use a combination of UEs locations, cell locations, and cell radii/transmit powers in deciding which dormant cells should be switched on. Furthermore, a timer value can be included in the activation request message sent from the coverage cell to the selected dormant cells. Upon timer expiry, the cell verifies if the condition required for staying on has been met, and else, goes back to dormant mode.

SUMMARY OF THE INVENTION

It is an object of the present invention to operate a mobile communication network with numerous small cells embedded therein in a power-efficient and cost-effective way.

In accordance with a first aspect of the invention, a network analyzer for optimizing radio coverage and power consumption within a mobile communication network is configured to gather radio measurements carried out by subscriber devices and/or radio base stations, and user geographical locations at the time the radio measurements have been carried out. The network analyzer is further configured to derive antenna geographical locations from the radio measurements and the user geographical locations, and radio propagation models from the antenna geographical locations that best fit the radio measurements at the user geographical locations, and to supply the so-derived radio propagation models from the so-derived antenna geographical locations to a radio resource controller for activation of dormant cells.

In accordance with a second aspect of the invention, a computer program product for optimizing radio coverage and power consumption within a mobile communication network comprises a first code portion for gathering radio measurements carried out by subscriber devices and/or radio base stations, and user geographical locations at the time the radio measurements have been carried out. The computer program product further comprises a second code portion for deriving antenna geographical locations from the radio measurements and the user geographical locations, and radio propagation models from the antenna geographical locations that best fit the radio measurements at the user geographical locations, and a third code portion for supplying the so-derived radio propagation models from the so-derived antenna geographical locations to a radio resource controller for activation of dormant cells.

In accordance with a third aspect of the invention, a method for optimizing radio coverage and power consumption within a mobile communication network comprises the step of gathering radio measurements carried out by subscriber devices and/or radio base stations, and user geographical locations at the time the radio measurements have been carried out. The method further comprises the steps of deriving antenna geographical locations from the radio measurements and the user geographical locations, and radio propagation models from the antenna geographical locations that best fit the radio measurements at the user geographical locations, and supplying the so-derived radio propagation models from the so-derived antenna geographical locations to a radio resource controller for activation of dormant cells.

In one embodiment of the invention, the network analyzer comprises a cell coverage database configured to be queried by the radio resource controller for a particular cell, and to return a particular radio propagation model from a particular antenna geographical location for the particular cell.

Alternatively, the cell coverage database may be queried for a particular geographical location, e.g. a user geographical location, and may return selected radio propagation models from selected antenna geographical locations located in a vicinity of the particular geographical location.

Alternatively, the cell coverage database may be queried for a particular geographical area, and may return selected radio propagation models from selected antenna geographical locations located within, or in a vicinity of, the particular geographical area.

In one embodiment of the invention, the network analyzer is further configured to automatically age out old radio measurements, to update the antenna geographical locations and the radio propagation models accordingly, and to supply the so-updated radio propagation models from the so-updated antenna geographical locations to the radio resource controller.

In one embodiment of the invention, the radio measurements comprise downstream measurements of cell beacon signals carried out by the subscriber devices.

In addition, the radio measurements may comprise upstream measurements of upstream communication signals carried out by the base stations during active communication sessions.

In one embodiment of the invention, the downstream measurements are off-line measurements supplied by a native or third-party application running on the subscriber devices.

In one embodiment of the invention, the user geographical locations are determined by the subscriber devices from Global Positioning System (GPS) data.

Alternatively, the user geographical locations may be determined by the subscriber devices by fingerprinting of the radio environment.

Still alternatively, the user geographical locations may be determined by the mobile communication network, e.g. by means of timing advance and/or angle of arrival measurements.

Embodiments of a computer program product according to the invention, or embodiments of a method according to the invention, correspond with the embodiments of a network analyzer according to the invention.

The present invention proposes to determine cell coverage information directly from radio measurements carried out by UEs and/or base stations, and from UE geographical positions at the time the radio measurements have been carried out. The cell coverage information comprises radio propagation models from antenna locations to be used by the radio resource controller so as to determine the most suitable cell for call handling.

First, the location of a particular antenna site for a particular cell is determined from the UE and/or base station measurements and respective UE locations, e.g. by means of the well-known triangulation method. Next, the parameters of a radio propagation model from the so-determined antenna location are adjusted so as to best fit the UE and/or base station measurements at those specific UE locations where the measurements are available, e.g. by minimizing a cost function.

The radio propagation model typically comprises the UE geographical location as main input parameter, and the expected signal strength (amplitude, power) for a particular cell at that UE location as main output parameter. The model may comprise further input parameters and/or output parameters, e.g. input parameters that need to be set by the base station itself for further network optimization (e.g., the base station transmit power).

The so-adjusted radio propagation models from the so-derived antenna locations are then supplied to the radio resource controller, and used interalia for activation of dormant cells. Whenever a request for a new communication session with a particular UE is received, the radio resource controller checks whether a more appropriate cell can take over this communication session based on the supplied radio propagation models and on the particular UE location, as well as on further criterion such as the induced power consumption impact, the induced interference and QoE impact, etc. If such a cell is found, and if the cell is dormant, then the cell is awaken and the communication session is transferred thereto.

By running these radio propagation models for each and every cell in a given geographical area, one can determine with sufficiently good accuracy the most appropriate cell among them to handle a particular UE at a particular location, even if no UE measurements are available at that particular location. Owing to this algorithm, one can afford switching most if not all idle cells into dormant mode, thereby achieving substantial power reduction.

The radio measurements are typically downstream measurements of cell's beacon signals performed by UEs. A downstream measurement can be performed while a UE is in idle mode and listens to the respective cells that are being traversed so as to detect a location area change (off-line measurements), or during an active communication session so as to detect the most appropriate cell to communicate with (on-line measurements).

The radio measurements may also be upstream measurements of UE uplink signals performed by serving base stations during active communication sessions (on-line measurements only).

The UE geographical locations at the time the measurements have been carried out, or an approximation thereof, are appended to the radio measurements. The UE locations can be determined either by the UEs (e.g., from GPS data or radio fingerprinting), or by the network (e.g., from timing advance measurements).

The radio measurements and respective UE locations are gathered by the serving base station or base station controller, or by a native or third-party application running on the subscriber devices, and next supplied to a network analyzer for further processing and determination of the cell coverage information.

Also, the network analyzer may keep track of the radio measurement times: when new radio measurements come in, old radio measurements are aged out and the radio propagation models are updated and supplied again to the radio resource controller, thereby tracking the always-changing radio environment.

The present invention is particularly advantageous as radio context data in relation with measurement locations converge much faster when compared with map-based measurements, further as radio access can be estimated without having users ever been there for measurements, still further as no drive-tests by the operator are needed, and still further as the whole process is automated, thereby easing handling and maintenance of fields data and making the new process more suitable for small cell deployment and next-generation networks.

We also consider such a mechanism to be superior to a grid-based approach, where signal strengths are provided for grid elements, mainly at a coarse-grain granularity. Indeed grids typically need to have a coarse grain structure in order to have sufficient samples to calculate on-average measures for grid elements. Also, grids typically do not meet environment shapes, such as terrain height profiles, street corners, etc.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
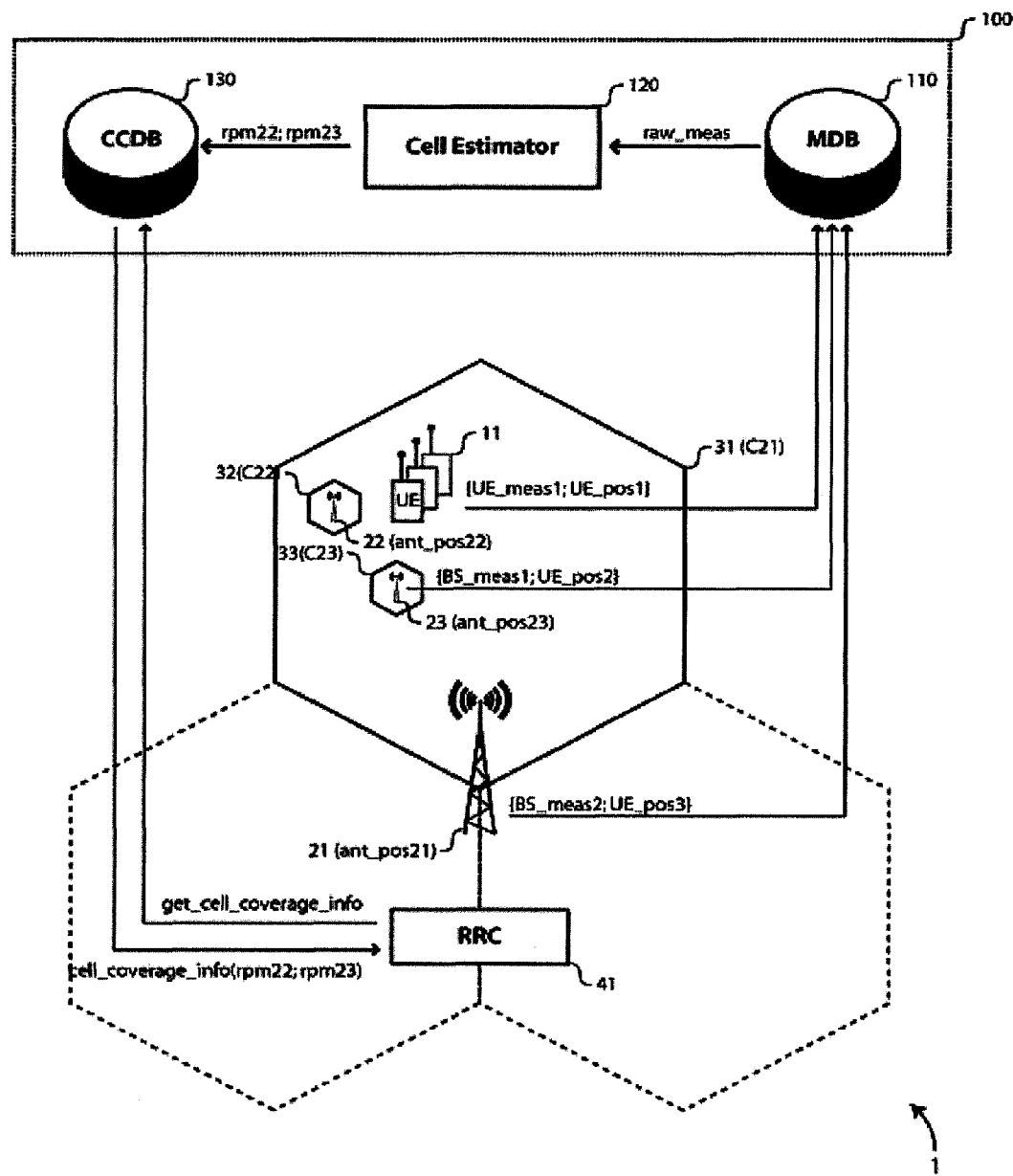
FIG. 1 represents a mobile network comprising a network analyzer as per the present invention.

There is seen in FIG. 1 a mobile (or wireless) communication network 1 comprising the following functional blocks:
UEs 11;
a coverage base station 21 operating a macro cell C21 having a large radio coverage area 31;
capacity base stations 22 and 23 operating short-radius cells C22 and C23 with respective confined radio coverage areas 32 and 33 wholly or partly encompassed within the radio coverage area 31;
a radio resource controller 41; and
a network analyzer 100.

The macro cell C21 provides an alway-on radio access within a particular geographical area, namely the radio coverage area 31, so as the UEs 11 can always connect to the mobile network 1.

Alternatively, the UEs 11 can connect to the mobile network 1 via a dedicated signaling-only access point, which may form part of the mobile communication network 1, or of another mobile/wireless network making use of another mobile/wireless technology, or through a dedicated satellite link. The request is then forwarded to a radio resource controller for ad-hoc radio resource activation and assignment within the mobile network 1.

The short-radius cells C22 and C23 provides increased capacity in targeted areas of data traffic concentration, and are typically shut down during low-activity periods (e.g. night time, week-ends, forecast days).

The antenna geographical positions from which radio signals are broadcast over the air by the base stations 21, 22 and 23 are denoted as ant_pos21, ant_pos22 and ant_pos23 respectively.

The UEs 11 perform radio measurements of the beacon signals that are being traversed while roaming from one location to another. Also both the UEs 11 and the base stations 21, 22 and 23 performs radio measurements of communication signals while communicating between each other. These radio measurements, together with the respective UE locations at the time the measurements have been performed, are reported to the network analyzer 100 for further processing. Presently in FIG. 1, the UEs 11 are shown as reporting first radio measurements and UE location {UE_meas1; UE_pos1}; the capacity base station 23 is shown as reporting second radio measurements and UE location {BS_meas1; UE_pos2}; and the coverage base station 21 is shown as reporting third radio measurements and UE location {BS_meas2; UE_pos3}.

The radio resource controller 41 is primarily for assigning and managing downlink and uplink radio resources used by the base stations and the UEs for radio communication over the air interface, that is to say a set of code and/or frequency and/or time resources assigned to the respective radio bearers for transport of user and signaling traffic.

The radio resource controller 41 is further configured for efficient Radio Resource Management (RRM) of the mobile network 1.

RRM is the system level control of co-channel interference and other radio transmission characteristics in mobile communication network. RRM involves strategies and algorithms for controlling parameters such as the transmit power, the cell and channel allocation, the handover criteria, the modulation scheme, the error coding scheme, etc. The objective is to utilize the limited radio spectrum resources and radio network infrastructures as efficiently as possible, also including the overall network power consumption.

RRM is especially important in systems limited by co-channel interference rather than by noise, for example in networks consisting of many adjacent access points that may reuse the same channel frequencies.

The objective of RRM is therefore to maximize the system spectral efficiency and power efficiency while guaranteeing a certain grade of service. The latter involves covering a certain area and avoiding outage or impairments due to co-channel interference, noise, attenuation caused by long distances, fading caused by shadowing and multi-path, etc. The grade of service is also affected by blocking due to admission control, scheduling starvation or inability to guarantee the requested QoS.

Dynamic RRM schemes adaptively adjust the radio network parameters to the traffic load, user positions, QoS requirements, etc. Dynamic RRM schemes are considered in the design of mobile networks, in view to minimize expensive manual cell planning and achieve tighter frequency reuse patterns, resulting in improved system spectral efficiency.

Examples of dynamic RRM schemes are power control algorithms, link adaptation algorithms, Dynamic Channel Allocation (DCA) or Dynamic Frequency Selection (DFS) algorithms, traffic adaptive handover, adaptive filtering (e.g., Single Antenna Interference Cancellation (SAIC)), dynamic diversity schemes (e.g., soft handover, phased array antenna with beam-forming and/or Multiple-Input Multiple-Output (MIMO) communications and/or space-time coding), admission control, cognitive radio, etc.

The radio resource controller 41 may be implemented as a central function, e.g. within a Radio Network Controller (RNC) or a Base Station Controller (BSC), or may be distributed across the radio base stations. Some RRM schemes can be autonomous algorithms, or coordinated algorithms that exchange information between each other.

The radio resource controller 41 further interfaces with the network analyzer 100 for fetching radio propagation models for one or more particular cells, or around a particular UE location, or within a certain geographical area, e.g. the coverage area whose radio resources are controlled by the radio resource controller 41 (see "get_cell_coverage_info" and "cell_coverage_info(rpm22; rpm23)" in FIG. 1, wherein rpm22 and rpm23 denotes radio propagation models for the capacity cells C22 and C23 as modeled by the network analyzer 100).

The radio propagation models are used, together with the respective UE positions and further criterion, to make the most appropriate decision as per the best cell to handle a particular communication session.

The first aspect to consider is whether a UE can be reached by a base station of the mobile network 1. The calculation of a best cell calculates, for the current activation status of the base stations plus the activation of one out of the sleeping base stations, the expected signal and interference levels at the current UE position. The calculation is performed by running the respective radio propagation models with the current UE position, and for each and every supposedly-active cells in the UE vicinity (e.g., a few hundreds meters or a few kilometers around the current UE position). The results are then compared to a threshold value for the absolute signal level and the Signal Noise and Interference Ratio (SNIR) level that is predicted at the current UE position. The process re-iterates while selecting another sleeping base station to be activated in the UE vicinity, thereby yielding an expected best cell for handling the call at the current UE position.

Next, the radio resource controller 41 switches the selected cell and corresponding base station equipment back into operational mode, and the call is transferred thereto by means of an handover procedure, or by having the UE autonomously attaching to this cell as it is deemed to be the best suitable cell for handling the call (either based on autonomous UE measurements, or based on cell access information returned from the coverage base station to the UE).

The SNIR conditions for the other currently active UEs may be calculated as well. It is checked for the other stations how their access conditions worsen when the new capacity base station is activated. In case that the costs are higher than the benefits arising from activating the new base station and adding the new session (worse radio conditions for others up to drops of other sessions), the cell activation will be re-considered (e.g., the call request may be handled by the coverage base station without activating the capacity base station).

The cell selection process may also consider further criterion, such as the involved power consumption impact in the mobile network 1 on account of a given capacity base station being awaken.

The network analyzer 100 comprises the following functional blocks:
  a raw measurements database 110 (or MDB), wherein raw measurements from UEs and/or base stations are held for further retrieval;
  a cell estimator 120 for selecting a radio propagation model type for a given cell, and for adjusting the parameter values of the selected model type so as to best fit the raw measurements of that given cell at those specific UE locations where measurements are available; and
  a cell coverage database 130 (or CCDB), wherein the so-adjusted radio propagation models are stored for further retrieval and use by the radio resource controller 41.

The raw measurements database 110 comprises raw measurement records that are filled in based on measurement reports from the UEs and/or the base stations.

A measurement record comprises the following pieces of information interalia:
  a unique identifier of the measurement performer, such as a UE identifier or a base station identifier;
  a unique identifier of the cell(s) being measured;
  the type of measurements being performed, such as Reference Signal Received Power (RSRP) measurements, or Reference Signal Received Quality (RSRQ) measurements, or Received Signal Code Power (RSCP) measurements, or Received Interference Power (RIP) measurements, or Reference Signal Time Difference (RSTD) measurements, or Timing Advance (TA) measurements, or Angle of Arrival (AoA) measurements;
  the UE location at the time a given measurement instance has been performed expressed as e.g. a binomial value {Longitude; Latitude}, possibly augmented with the UE altitude value for 3D propagation modeling; and
  the year, day and GMT time at which a given measurement instance has been performed.

The cell coverage database 130 acts as a storage place for adjusted cell propagation models within a certain geographical area. For instance, between 50 000 up to 500 000 radio propagation model instances need to be stored for a territory like Germany. These numbers are for a nation-wide single provider, not taking the network information of competitors into account.

The cell coverage database 130 implements a set of standardized querying primitives, through which the database can be queried (see "get_cell_coverage_info" and "cell_coverage_info(rpm22; rpm23)" in FIG. 1). The request rate (or reading rate) for that storage server might be a medium rate if we just allow radio resource controllers querying the database, or might be a higher rate if user applications or middleware functions are allowed to access the database. Then, we can think of requests rates of up to one million per second (one per user per minute over the day if we think of a middleware opportunistic message communication function). However, the amount of requests should not be a problem as we have relatively-static data and clear write authorities, so known data replication and separation techniques can be applied.

The data structure for the cell coverage database 130 are records with sub-entries (e.g., XML-structured data). A cell record includes the following pieces of information interalia:
- a unique identifier of the cell;
- a cell type, such as the radio access technology of the cell (GSM, UMTS, CDMA, LTE, Wifi, Wimax, etc), a cell range (macro, micro, pico, femto, etc), etc;
- the radio spectrum band in which the cell operates;
- cell access information (public, private, hybrid); and
- an adjusted radio propagation model for that cell.

The cell coverage database 130 may comprise further pieces of information, such as a power consumption awakening cost for the base station operating the cell, and/or a power consumption model for computing the average consumed power for a given path loss and a required grade of service.

Queries of the cell coverage database 130 can be done using either a cell identifier, or a certain geographical position, or a certain geographical area. An array of relevant radio propagation models will be returned to the requesting entity, namely the radio resource controller 41.

The radio propagation models returned to the radio resource controller 41 are encoded as mathematical formulas, thereby yielding very-high resolution accuracy (like vectored graphics when compared to bitmap graphics). By so doing, the amount of cell coverage information exchanged is substantially reduced and the storage requirements for the radio resource controller 41 are substantially lowered, meaning higher scalability as the number of deployed capacity cells increases.

As an example of encoding, the cell coverage database 130 may return the type of radio propagation model to use as a pointer among a pre-determined set of mathematical formulas with identifiable parameters. The cell coverage database 130 further returns the parameter values for some of these identifiable parameters, which parameter values being adjusted by the cell estimator 120 from the UE and/or base station measurements. A returned radio propagation model further comprises one or more unknown parameters, such as the geographical position at which the signal level is to be computed, the base station transmit power, etc, to be filled in directly by the radio resource controller 41.

The cell estimator 120 is configured to determine radio propagation models from estimated antenna locations by means of raw UE and/or base station measurements as stored in the raw measurement database 110 (see "raw_meas" in FIG. 1).

The cell estimator 120 is first configured to determine antenna locations of certain cells, e.g. some randomly deployed pico or metro cells without GPS receiver.

The distance between a UE and the antenna of the measured cell is to be assessed first. The measured cell is likely to be the current serving cell as measurement indicative of the round trip time are needed. However, even passive measurements appear to be possible given that good timing sources are available.

The antenna locations of a measured cell are then determined from the well-known triangulation method: a first distance estimated within some tolerance bound from first radio measurements available at a first UE location yields a first circle ring centered around that UE location (the ring width matches the measurement tolerance). The base station antenna is deemed to be within that first circle ring. The process is repeated with at least two other UE locations to yield an estimated position of the antenna location of the measured cell. One may also use further measurements such as the angle of arrival.

Some antenna locations may also be directly retrieved from fields or GPS data, e.g. for macro cells or for pico cells with GPS equipment embedded therein.

The cell estimator 120 is next configured to determine, for a particular cell, a radio propagation model from the antenna location of that cell that best fits the UE and/ore base station measurements that are available for that cell.

It is to be noticed first that UE and/or base station measurements are badly influenced by many factors. For example, UEs measurements will spread depending on how the user covers the antenna with his head, hand or body, as well as on the type of protection case he uses. There is also a spread among device types, as well as between devices of the same type. Furthermore, UE and base station measurements do not have the same quality as measurements from special measurement equipment used in drive tests.

On the other hand, we will have much more measurement data available, to which we can apply all types of data improvement concepts. For instance, and assuming the measurement errors have a zero average, the cell estimator 120 may average all measurements available at a given location across many devices so as to come up with a more reliable figure.

The cell estimator 120 may also accommodate a mechanism for discarding radio measurements that are inappropriate or inaccurate for whatever reasons (device bug, etc).

The cell estimator 120 determines a radio propagation model for a given cell by a best-fitting method, namely by finding the parameter values of a given radio propagation model that minimize a cost function. The cost function typically quantifies the difference, across all the available measurement locations, between the receive signal power as predicted by the model and the one actually measured by the UEs.

The cell estimator 120 may use any of the following well-known radio propagation models: two-path model, one-slope model, Hata-Okumura model, Walfish-Ikegami model, dual-slope model, Berg model, etc.

The radio propagation models, whose parameters values have been adjusted by the cell estimator 120 for best fitting the available UE and base station measurements, are next stored into the cell coverage database 130 for further retrieval by the radio resource controller 41 (see "rpm22; rpm 23" in FIG. 1).

The cell estimator 120 is further configured to scan the raw measurement database 110 so as to find out and to delete UE and/or base station measurements beyond a certain age. Thereupon, the antenna locations and radio propagation models are estimated again, and pushed into the cell coverage database 130.

Figure 2:
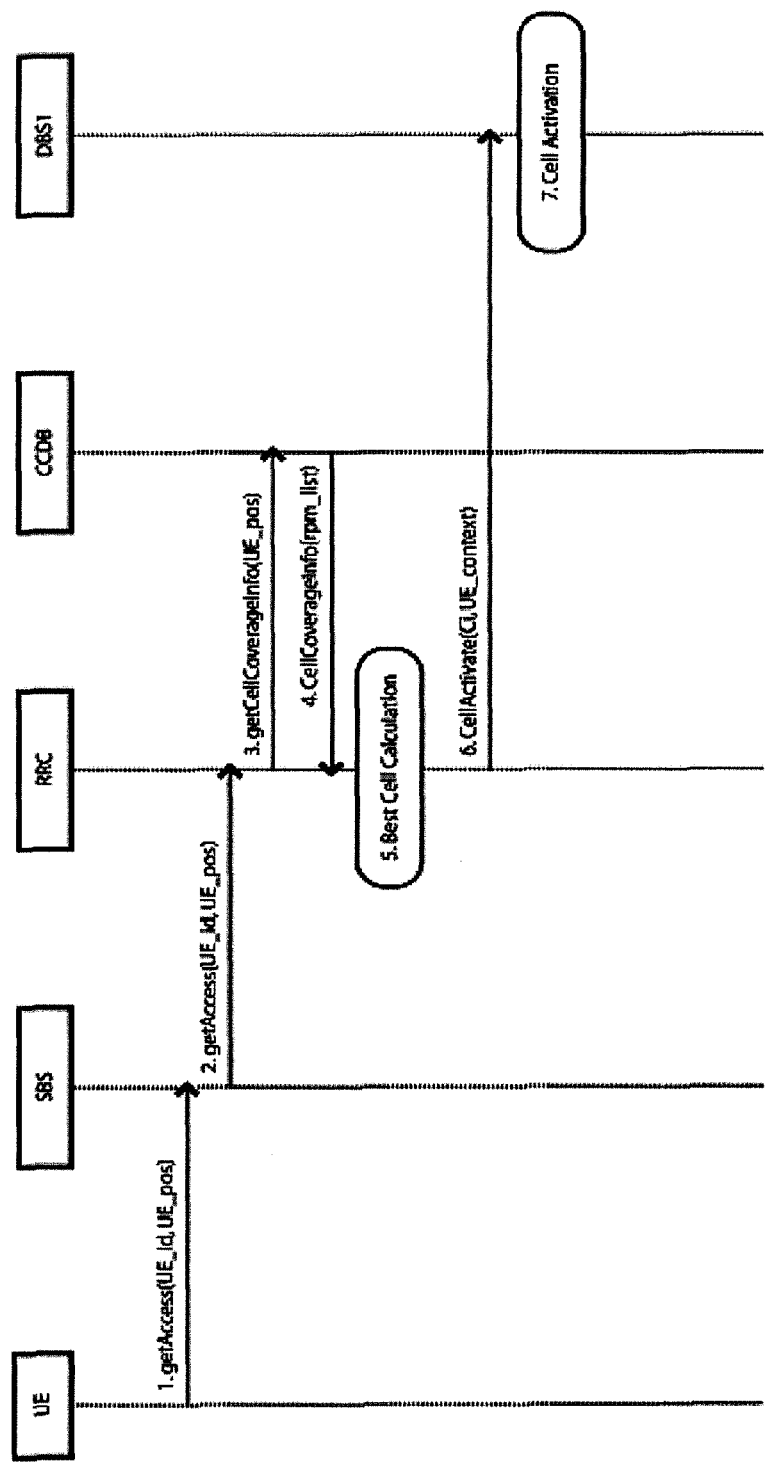
FIGS. 2 and 3 represent message flow charts for activation of dormant cells.

There is seen in FIG. 2 a message flow chart representing the most noticeable message/data exchanges between network elements of a mobile network upon call request.

The setup includes a signaling base station SBS that provides signaling access anytime-anywhere, data base stations DBS1 and DSB2 that are currently switched off, and a UE that requests a new communication session. Furthermore, a radio resource controller RRC and a cell coverage database CCDB are involved.

The UE first requests a data session by issuing an access request via the signaling base station SBS. The access request includes a current UE location UE_pos if known by the UE, and a unique UE identifier UE_id (see "1. getAccess(UE_id, UE_pos)" in FIG. 2). Alternatively, the UE location can be estimated and appended by the signaling base station SBS.

The signaling base station SBS forwards the received request to the radio resource controller RRC in order to find a suitable cell (see "2. getAccess(UE_id, UE_pos)" in FIG. 2).

The radio resource controller RRC queries the cell coverage database CCDB so as to get the coverage information for cells in a certain vicinity of the UE position UE_pos (see "3. getCellCoverageInfo(UE_pos)" in FIG. 2). Alternatively, the relevant coverage information could already be available owing to a prior communication session, or could be pre-fetched before any communication takes place.

The cell coverage database CCDB delivers the requested coverage information as a list of cell information records. The cell information records includes respective radio propagation models from cell antenna locations (see "4. CellCoverageInfo(rpm_list)" in FIG. 2, wherein rpm_list denotes a list of radio propagation models).

The radio resource controller RRC calculates an ordered list of best cells for the UE current position (see "5. Best Cell Calculation" in FIG. 2).

The radio resource controller RRC next signals to the data base station operating the first cell in the list, presently the data base station DBS1, to activate the corresponding cell (see "6. CellActivate(ci, UE_context)" and "7. Cell Activation" in FIG. 2, wherein Ci denotes the selected best cell), and to switch on corresponding pieces of equipment (transceiver, power amplifier, etc). The activation information can already include session context information of the UE.

The signaling base station SBS may return cell access information to the UE, such as an identifier of the cell to attach to.

Still alternatively, the signaling base station may let the UE detect the awakening of the data base station DBS1 and corresponding beacon signal transmission, and let the UE autonomously attach to the corresponding cell and establish the new communication session therewith.

Figure 3:
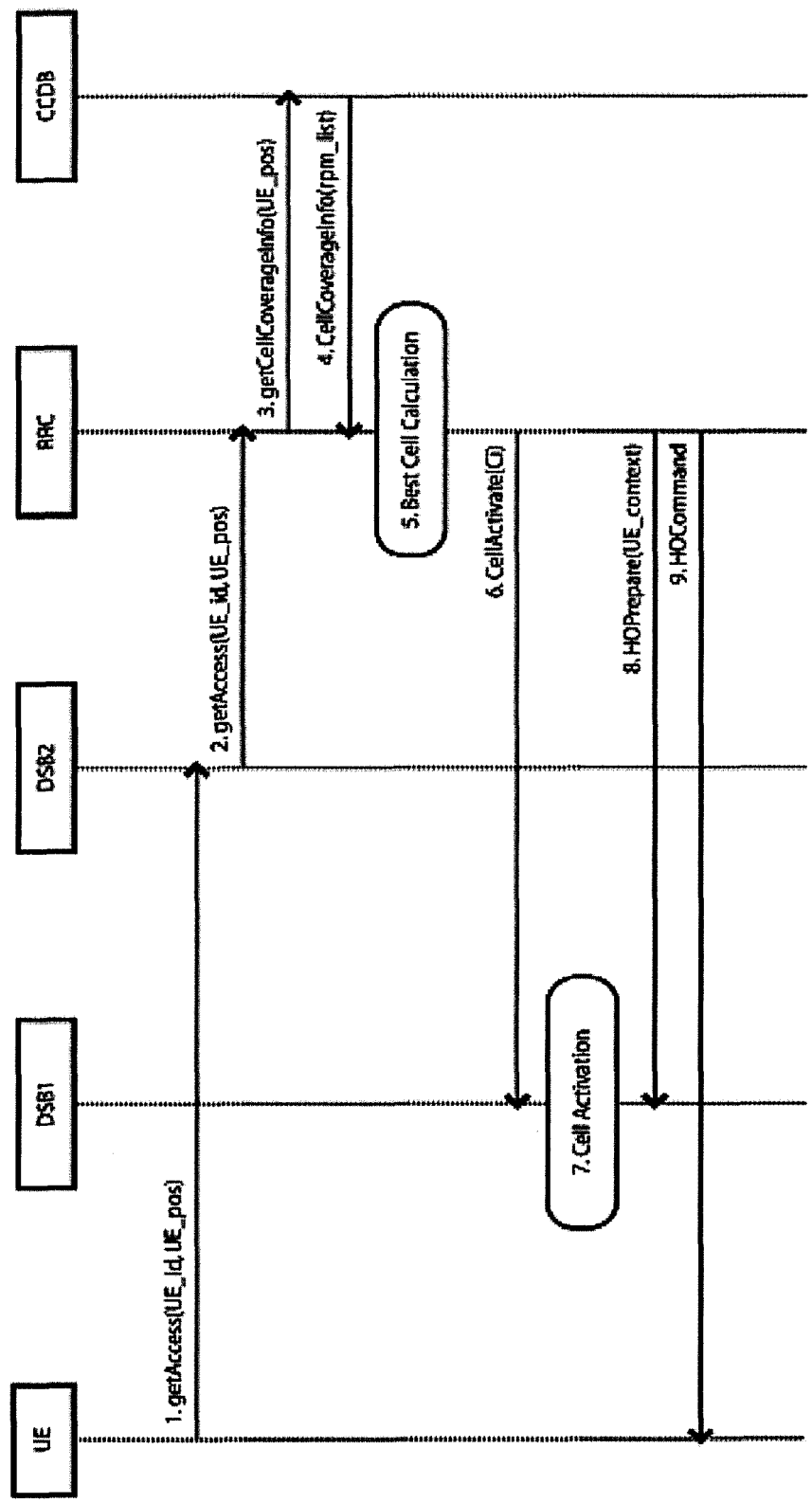

There is seen in FIG. 3 an alternative use case wherein the UE directly attaches to the mobile network through a data base station, namely the data base station DBS2.

The UE comes from a sleep mode to an active mode, and requests a new communication session to the data base station DBS2 (see "1. getAccess(UE_id, UE_pos)" in FIG. 3). This is again done together with the UE location UE_pos.

Now the data base station DBS2 can either directly serve the UE, or can forward the request to the radio resource controller RRC so as to determine whether the UE can be better served by another sleeping capacity cell (see "2. getAccess(UE_id, UE_pos)" in FIG. 3).

In order to achieve this (as in the pure wake-up procedure), the radio resource controller RRC requests cell coverage information from the cell coverage database CCDB (see "3. getCellCoverageInfo(UE_pos)" and "4. CellCoverageInfo (rpm_list)" in FIG. 3), and calculates possible alternative attachment points (see "5. Best Cell Calculation" in FIG. 3). In the event of such an attachment point being found, namely the data base station DBS1, the radio resource controller RRC activates it (see "6. CellActivate(Ci)" and "7. Cell Activation" in FIG. 3), and initiates a handoff thereto once the target base station activation procedure completes (see "8. HOPrepare (UE_context)" and "9. HOCommand" in FIG. 3).

Although the radio resource controller RRC is drawn in FIGS. 2 and 3 as a separate functional entity, it may form part of the signaling and/or data base stations.

It is to be noticed that the term 'comprising' should not be interpreted as being restricted to the means listed thereafter. Thus, the scope of the expression 'a device comprising means A and B' should not be limited to devices consisting only of components A and B. It means that with respect to the present invention, the relevant components of the device are A and B.

The description and drawings merely illustrate the principles of the invention. It will thus be appreciated that those skilled in the art will be able to devise various arrangements that, although not explicitly described or shown herein, embody the principles of the invention. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a processor should not be construed to refer exclusively to hardware capable of executing software, and may implicitly include, without limitation, digital signal processor (DSP) hardware, network processor, application specific integrated circuit (ASIC), field programmable gate array (FPGA), etc. Other hardware, conventional and/or custom, such as read only memory (ROM), random access memory (RAM), and non volatile storage, may also be included.

The invention claimed is:

1. A network analyzer for optimizing radio coverage and power consumption within a mobile communication network, and configured to gather radio measurements carried out by subscriber devices and/or radio base stations, and user geographical locations at the time the radio measurements have been carried out, to derive antenna geographical locations from the radio measurements and the user geographical locations, and radio propagation models from the antenna geographical locations that best fit the radio measurements at the user geographical locations, and to supply the so-derived radio propagation models from the so-derived antenna geographical locations to a radio resource controller for activation of dormant cells.

2. A network analyzer according to claim 1, wherein the network analyzer comprises a cell coverage database configured to be queried by the radio resource controller for a particular cell, and to return a particular radio propagation model from a particular antenna geographical location for the particular cell.

3. A network analyzer according to claim 1, wherein the network analyzer comprises a cell coverage database configured to be queried by the radio resource controller for a particular geographical location, and to return selected radio propagation models from selected antenna geographical locations located in a vicinity of the particular geographical location.

4. A network analyzer according to claim 1, wherein the network analyzer comprises a cell coverage database configured to be queried by the radio resource controller for a particular geographical area, and to return selected radio propagation models from selected antenna geographical locations located within, or in a vicinity of, the particular geographical area.

5. A network analyzer according to claim 1, wherein the network analyzer is further configured to automatically age out old radio measurements, to update the antenna geographical locations and the radio propagation models accordingly, and to supply the so-updated radio propagation models from the so-updated antenna geographical locations to the radio resource controller.

6. A network analyzer according to claim 1, wherein the radio measurements comprise downstream measurements of cell beacon signals carried out by the subscriber devices.

7. A network analyzer according to claim 1, wherein the radio measurements comprise upstream measurements of upstream communication signals carried out by the base stations during active communication sessions.

8. A network analyzer according to claim 6, wherein the downstream measurements are off-line measurements supplied by a native or third-party application running on the subscriber devices.

9. A network analyzer according to claim 1, wherein the user geographical locations are determined by the subscriber devices from Global Positioning System GPS data.

10. A network analyzer according to claim 1, wherein the user geographical locations are determined by the subscriber devices by fingerprinting of the radio environment.

11. A network analyzer according to claim 1, wherein the user geographical locations are determined by the mobile communication network.

12. A non-transitory computer program product for optimizing radio coverage and power consumption within a mobile communication network, configured to:
    gather, according to a first code portion, radio measurements carried out by subscriber devices and/or radio base stations, and user geographical locations at the time the radio measurements have been carried out;
    derive, according to a second code portion antenna geographical locations from the radio measurements and the user geographical locations, and radio propagation models from the antenna geographical locations that best fit the radio measurements at the user geographical locations; and
    supply, according to a third code portion, the so-derived radio propagation models from the so-derived antenna geographical locations to a radio resource controller for activation of dormant cells.

13. A method for optimizing radio coverage and power consumption within a mobile communication network, and comprising:
    gathering radio measurements carried out by subscriber devices and/or radio base stations, and user geographical locations at the time the radio measurements have been carried out;
    deriving antenna geographical locations from the radio measurements and the user geographical locations, and radio propagation models from the antenna geographical locations that best fit the radio measurements at the user geographical locations; and
    supplying the so-derived radio propagation models from the so-derived antenna geographical locations to a radio resource controller for activation of dormant cells.

* * * * *